Patented Sept. 6, 1949

2,481,053

UNITED STATES PATENT OFFICE 2,481,053

WELDING OR BRAZING FLUX COMPOSITION

Rene Wassermann, New York, N. Y.

No Drawing. Application July 28, 1945,
Serial No. 607,657

5 Claims. (Cl. 148—26)

The present invention relates generally to fluxes and is more particularly concerned with flux compositions for use in connection with welding or brazing operations of articles made of aluminum, alloys predominantly containing aluminum, magnesium and magnesium alloys. This application is a continuation-in-part of my U. S. Patent Application Serial No. 449,183 filed June 30, 1942, now abandoned.

It is a well known fact that heat treatment of aluminum or any of the aforesaid alloys causes rapid oxidation of the surface of aluminum, magnesium or aluminum or magnesium alloys and especially of the surfaces of weld joints employing aluminum or aluminum alloys. As a consequence thereof, the bonding power of the welding or brazing alloys will be considerably reduced, blow holes and other deficiencies of the weld will cause objectionable joints.

It has already been proposed to provide a flux composition especially designed for brazing of aluminum or magnesium work pieces. These fluxes employ a carrier with the addition of zinc chloride or cadmium chloride. Alkali metal compounds of halides, such as potassium, sodium chlorides and/or fluorides have been employed together with lithium chloride as carrier to which relatively small amounts of either zinc chloride or cadmium chloride below a range of 12% to 16% of the total weight of the flux composition were added.

Higher amounts were considered objectionable and undesirable because the deposition of heavy metals, such as zinc or cadmium, would render the brazed joint more susceptible to corrosion.

While the main purpose of such known flux compositions was to prohibit the formation of oxides of aluminum or magnesium and to reduce any oxides that may be already on the surface of the aluminum or magnesium article, it was apparently not recognized that an increase of cadmium chloride in a well balanced carrier containing sodium chloride, lithium chloride and potassium chloride together with sodium fluoride brings about certain advantages in welding and brazing operations of aluminum and/or magnesium articles, which could not be attained or were disregarded in the known flux compositions.

It is therefore one of the objects of this invention to provide a flux composition which yields substantially uniform results in welding operations with weld or brazing metals having a wide range of melting points.

It is another object of the present invention to provide clean and unadulterated welds which are color-matching with the base metal or metals.

It is a further object of the present invention to provide a flux substance which is so compounded and whose ingredients are so selected that it yields a marked wetting power which brings about speedy welding and brazing operations, ensures capillary action of the fluid weld metal and causes a considerable economy of the heretofore employed weld metals by saving about fifty per cent thereof as compared with known processes employing before mentioned known flux substances.

It is still another object of the present invention to provide a flux which will not only effectively prevent oxidation and reduce or dissolve oxides formed during welding and brazing operations, but is useful for a great variety of aluminum welding alloys without regard to their melting points, so that the new flux composition can be employed in a more economical manner and without causing effects due to overheating of the aluminum or magnesium base metal surfaces to be treated.

In brazing or welding aluminum pieces a proper flux composition is essential for a successful operation. Aluminum when heated with an oxy-acetylene torch is easily burned and has a high affinity for oxygen. It is therefore of vital importance to employ a flux composition which is an indicator for the applied heat and which allows the employment of aluminum welding rods with relatively high melting points. The welding or brazing rods for aluminum may vary widely according to the thickness of the aluminum pieces and the character of the joint to be achieved between said pieces.

Despite the various alloys used for the aluminum welding rod care is to be taken that the flux substance applied does not cause any discoloration around the weld and make the latter discernible and too conspicuous.

While the weld metal chosen may be color-matching with the aluminum base metal, too little or no attention has been paid to the flux composition in this respect, and it was rather the aim of the prior art to bring about a strong, smooth and even weld seam.

The present invention fulfills all the necessary requirements as regards the tensile strength and other mechanical properties of the weld seam, as well as color-match and avoidance of dark spots on and around the seam.

These and other objects of the invention will be realized from the ensuing description thereof in which reference is made to various comparative tests.

The flux according to the present invention may provide a powder for welding, brazing or like operations by means of an oxy-acetylene torch or carbon arc permitting reclaiming and repairs of all kinds of aluminum parts, tubing, sheets and the like which consist in part or mainly of aluminum. The flux comprises cadmium chloride in an amount of about 20% by weight or more and further contains additions of lithium chloride, sodium chloride, potassium chloride, and sodium fluoride. A minor proportion of the cadmium chloride may be replaced by zinc chloride, provided that the zinc chloride content be kept below 10% by weight of the compositions.

As an example for preparing the welding flux mixture it is proposed to add to about one fourth of cadmium chloride substantially equal parts of lithium chloride, sodium chloride, and potassium chloride; and some small addition of sodium fluoride or sodium bifluoride. It has further been found that it may be considered useful to admix a small amount of zinc chloride, not more than 8% to 10% by weight, to the aforesaid mixture and to lower accordingly the cadmium chloride content. The flux may be prepared under usual precautions, as the resultant flux substance is preferably anhydrous, it being necessary that the substance is ground to fine powder for best results. The flux may then be employed in dry powder or in paste form.

The effect of cadmium chloride is that, when heated on the aluminum metal surface, it produces a thin skin or blanket of cadmium, thereby preventing oxidation of aluminum, and will not leave any objectionable residues on the deposited weld. It may be noted that a kind of uniform plating action is produced over the molten metal by the cadmium chloride. Cadmium chloride combined with lithium chloride contribute effectively to a reducing action with respect to any formation of aluminum oxides during the welding operation and by the welding rod material. The combined cadmium chloride and lithium chloride should amount to at least 50% of the total weight of the flux composition contemplated by this invention. In case a minor part of the cadmium chloride has been replaced by zinc chloride, then the zinc chloride content should be included in calculating the said minimum proportion of 50%. The application of the flux may be carried out in any conventional manner (to protect the base surface and/or welding alloy) and is preferably applicable to readily oxidizable metals, such as aluminum and its alloys, when subjected to welding, brazing and like heating operations.

The flux made according to this invention aids in forming a strong bond between the weld and the aluminum parts to be joined, which result may be particularly ascribed to the presence of lithium chloride and cadmium chloride as the main constituents of the flux.

Various tests have been conducted in which it has been found that cadmium chloride is to be preferred alone or in combination with lesser amounts of zinc chloride. The following examples are given which have resulted in a very efficient flux composition:

I

| | Per cent by weight |
|---|---|
| Sodium chloride | about 20 |
| Lithium chloride | about 30 |
| Potassium chloride | about 20 |
| Sodium fluoride | about 10 |
| Cadmium chloride at least | 20 |

II

| | Per cent by weight |
|---|---|
| Sodium chloride | about 20 |
| Lithium chloride | about 30 |
| Potassium chloride | about 20 |
| Sodium fluoride | about 10 |
| Cadmium chloride | between 10 to 20 |
| An appreciable amount of zinc chloride but less than | 10 |

The amount of cadmium chloride or total amount of cadmium chloride and zinc chloride, as the case may be, may be further increased to about 30% by weight, whereas the amount of lithium chloride may remain substantially unchanged or be lowered but only to such an extent that the total amount of lithium chloride and cadmium chloride (calculating any zinc chloride as though it were cadmium chloride) will not be less than 50% by weight of the flux substance.

It has further been found that if the zinc chloride content exceeded 10%, the wetting of the aluminum base parts became very spotty and the same were easily subjected to overheating effects.

If the sodium chloride, lithium chloride and potassium chloride amounted to less than 60% of the total weight of the composition, the results were unsatisfactory due to the high melting point, and aluminum sheet material was burned before the wetting of the flux substance became effective.

The examples hereinabove given ensure very rapid melting of the flux, which provides a high capillary flow for the aluminum alloy employed. This aluminum alloy may contain at least 90% by weight of aluminum with other known additions, such as silicon.

Upon lowering of the cadmium chloride content and partial replacement thereof by zinc chloride no strong wetting power was obtained and the capillary flow action of the aluminum alloy was somewhat decreased.

One of the most outstanding results obtained by this invention is that thin aluminum or magnesium metal pieces, such as plates, sheets and tubings, can be welded or brazed substantially without warping and distortion and that no discoloration of the weld or the adjacent base parts will be had.

The new composition promotes the flowing qualities of the weld metal and tests have shown that about 50% of the weld metal may be saved in comparison with the working of known flux substances containing considerably less cadmium chloride and in which the lithium chloride together with the cadmium chloride and zinc chloride, if the latter is present, amount to less than 50% of the total weight of the flux composition. The new flux composition readily occludes oxides from molten weld metal and heated base metal, has apparently sufficient surface tension to form a fine skin over the molten weld metal and will not influence or change the composition of the latter. The absence of zinc chloride in some instances, may improve the quality of the flux composition, since zinc fumes are highly objectionable to healthful working conditions and will sometimes cause streaks or stains on the surface of the base metal. The increase of the content of lithium chloride will lower the melting point of the flux, whereas the higher amount of cadmium chloride contributes to the improvement of the deoxidizing action on the weld and base metal and will further the raising of the melting point of the flux substance. Thus aluminum alloys with higher melting points become applicable in connection with such flux. Since cadmium has a higher affinity for aluminum than zinc has, it has been found that the capillary action due to the new flux substance will be rapidly achieved and before the bonding action of the weld metal is effectuated.

It is further to be noted that sodium fluoride may be replaced entirely by sodium bifluoride which should amount to about 10% by weight.

It can thus be seen that there has been provided a flux composition which may preferably comprise sodium chloride about 20% by weight, lithium chloride ranging between 25% to 30% by weight, potassium chloride about 20% by weight, sodium fluoride about 10% by weight, and from 20% to 25% by weight of cadmium chloride and zinc chloride, zinc chloride being less than 10% by weight of the whole.

It will be understood that the values and proportions specified are approximate, not absolute, and that within the scope of the invention small amounts of ingredients other than those specified may be entered into the flux for imparting special characteristics when the presence of those ingredients does not materially destroy other desirable characteristics of the flux.

Having thus described the invention, what is claimed as new and desired to be secured by Letters Patent, is:

1. A flux composition consisting of from about 20% to about 30% by weight of at least one of the group of salts consisting of cadmium chloride and zinc chloride, but not more than 10% by weight of zinc chloride, lithium chloride ranging between 25% and 30% by weight, the total of the foregoing salt contents amounting to at least 50% by weight, approximately 10% by weight of a sodium fluoride, sodium chloride and potassium chloride forming the remainder.

2. A flux composition consisting of from about 20% to about 30% by weight of cadmium chloride, lithium chloride in an amount ranging between 25% and 30% by weight, the total cadmium chloride and lithium chloride contents amounting to at least 50% by weight, sodium chloride and potassium chloride in approximately equal amounts, and a sodium fluoride in an amount of approximately 10% by weight.

3. A flux composition consisting of cadmium chloride and less than 10% by weight of zinc chloride, the total of the cadmium chloride and zinc chloride contents ranging between 20% and 25% by weight, lithium chloride ranging between 25% and 30% by weight, sodium chloride about 20% by weight, potassium chloride about 20% by weight, and sodium fluoride about 10% by weight.

4. A flux composition essentially comprising about 20% by weight of cadmium chloride, about 30% by weight of lithium chloride, about 20% by weight of sodium chloride, about 20% by weight of potassium chloride, and about 10% by weight of sodium fluoride.

5. A flux composition consisting of about 25% by weight of cadmium chloride, the remainder being composed of substantially equal parts of lithium chloride, sodium chloride and potassium chloride together with about 10% by weight of a sodium fluoride.

RENE WASSERMANN.

REFERENCES CITED

The following references are of record in the file of this patent:

UNITED STATES PATENTS

| Number | Name | Date |
| --- | --- | --- |
| 2,243,424 | Horowitz | May 27, 1941 |
| 2,299,165 | Miller | Oct. 20, 1942 |
| 2,299,166 | Miller | Oct. 20, 1942 |